(12) United States Patent
Cook et al.

(10) Patent No.: US 8,239,821 B2
(45) Date of Patent: Aug. 7, 2012

(54) SYSTEM AND METHOD FOR CREATING AND UPDATING A DATA MODEL FROM DISPARATE EVENTS RECEIVED ON ARBITRARY APPLICATION THREADS

(75) Inventors: Thomas A. Cook, Boulder, CO (US); Troy Beecroft, Broomfield, CO (US); Thomas Carl Stamm, Louisville, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1133 days.

(21) Appl. No.: 12/113,558

(22) Filed: May 1, 2008

(65) Prior Publication Data
US 2008/0301625 A1 Dec. 4, 2008

Related U.S. Application Data

(60) Provisional application No. 60/915,357, filed on May 1, 2007.

(51) Int. Cl.
*G06F 9/44* (2006.01)
(52) U.S. Cl. .......... 717/104; 717/123
(58) Field of Classification Search ........... 717/104, 717/123
See application file for complete search history.

(56) References Cited

U.S. PATENT DOCUMENTS

| | | | |
|---|---|---|---|
| 5,590,319 A * | 12/1996 | Cohen et al. | 707/E17.058 |
| 6,237,143 B1 * | 5/2001 | Fontana et al. | 717/127 |
| 7,086,009 B2 * | 8/2006 | Resnick et al. | 715/771 |
| 7,089,533 B2 * | 8/2006 | Vosburgh | 717/123 |
| 7,480,893 B2 * | 1/2009 | Berenbach et al. | 717/104 |

OTHER PUBLICATIONS

Antkiewicz et al., "FeaturePlugin: Feature Modeling Plug-In for Eclipse," ACM, 2004, 5pg.*
Foster et al., "Leveraging Eclipse for Integrated Model-Based Engineering of Web Services Compositions," IBM, 2005, 6pg.*

* cited by examiner

*Primary Examiner* — Li Zhen
*Assistant Examiner* — Ryan Coyer
(74) *Attorney, Agent, or Firm* — Fliesler Meyer LLP

(57) ABSTRACT

An abstract component model can be used to drive an editor by providing an underlying stateful model for component implementation without the need to re-implement details, such as event listening, lifecycle and update management, etc. An implementation needs to provide objects that make up the model, some logic to listen to environmental changes and recognize when an update is needed, and a builder which can generate a lightweight version of the model based on the current "state of the world." In addition, abstract component model is operable to support an editor such as page flow.

26 Claims, 13 Drawing Sheets

SYSTEM AND METHOD FOR CREATING AND UPDATING A DATA MODEL FROM DISPARATE EVENTS RECEIVED ON ARBITRARY APPLICATION THREADS

CLAIM OF PRIORITY

This application claims priority from the following application, which is hereby incorporated by reference in its entirety:

U.S. Provisional Application No. 60/915,357, entitled SYSTEM AND METHOD FOR CREATING AND UPDATING A DATA MODEL FROM DISPARATE EVENTS RECEIVED ON ARBITRARY APPLICATION THREADS, by Thomas A. Cook et al., filed on May 1, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of component model implementation and deployment.

BACKGROUND

Integrated development environment (IDE) is a software application that provides comprehensive facilities to computer programmers for software development. An IDE normally consists of a source code editor, a compiler and/or interpreter, build automation tools, and a debugger. IDEs are designed to maximize programmer productivity by providing components with user interfaces, thus minimizing the burden on the programmer to manage and control the software development.

During the software development process, such as implementation and deployment of applications and/or Web-based services, various type of information needs to be incorporated into the data models that support various IDE features. Such information includes updates from file systems and compilers, as well as user inputs.

Providing visual representations of complex systems can be a challenge for tool vendors in the IDE space. IDEs accumulate a tremendous amount of information about a code base. Making sense of all of this information can sometimes be done using a Model View Controller (MVC) design pattern, where an object model provides a domain-specific representation of information shown by one or more views (visual representations) of that information. However, the use of the MVC design pattern alone is often inadequate when modeling complex, ever changing information.

DETAILED DESCRIPTION

Figure 1:
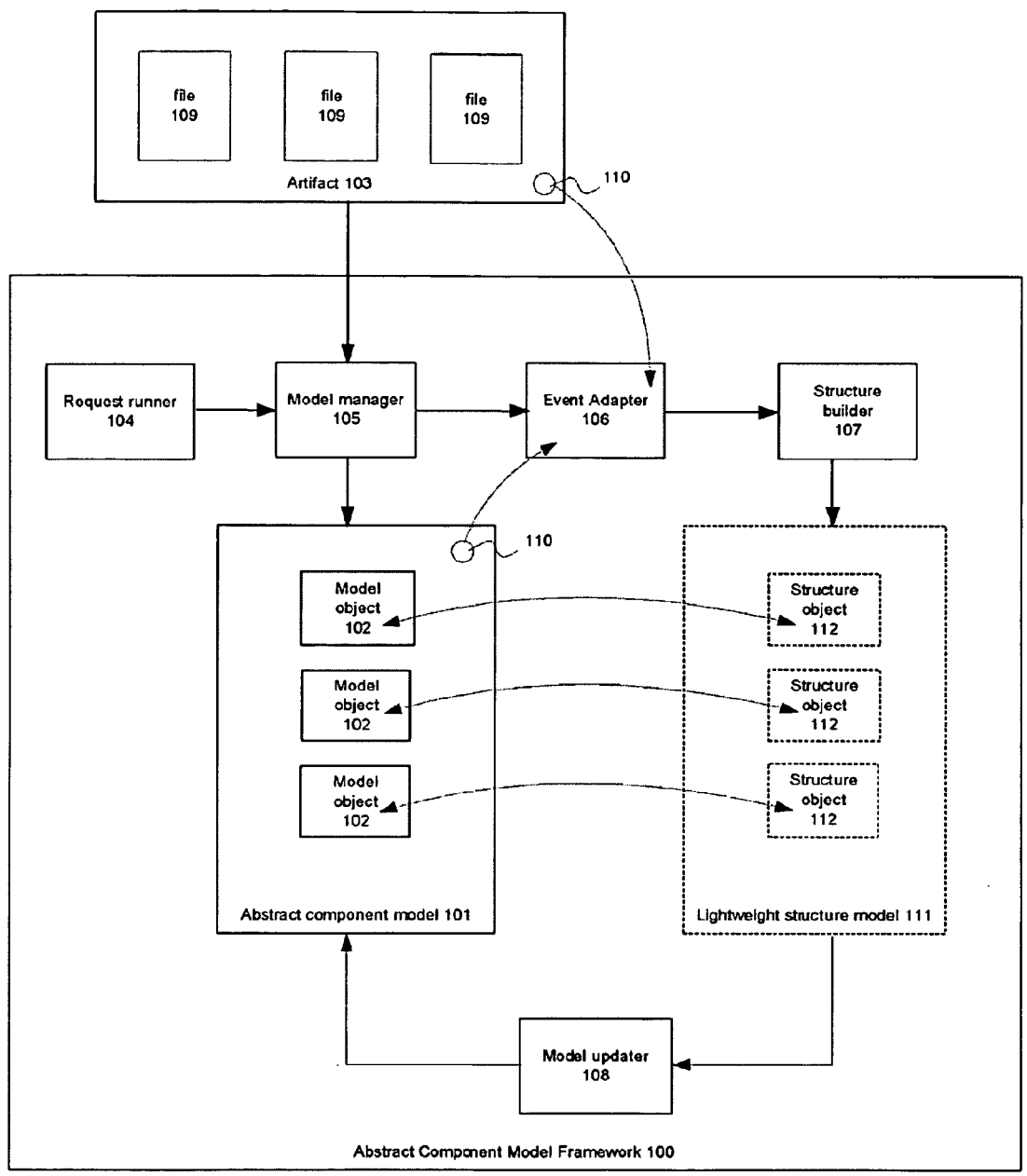
FIG. 1 is an illustration of an exemplary abstract component model framework in accordance with one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In accordance with one embodiment of the present invention, providing a framework for producing domain specific object models is desirable when problems beyond simple information display become necessary. In some cases, these problems are 1) providing a model responsive enough to enable real time editing of the model and relevant underlying artifacts, 2) coalescing changes to relevant underlying artifacts in such a way that these changes could be reflected in the model A) reliably and B) in a efficient manner (i.e., quickly) and 3) providing basic support (i.e. a framework) for the implementation of multiple domain-specific models where reuse of these solutions could apply across all models.

In accordance with one embodiment of the present invention, an example of implementation and deployment of applications and/or Web-based services uses a page flow explorer.

In some embodiments, web applications that perform user interface functions (such as displaying "Hello, world!" in a browser page) can be implemented as page flows. A page flow is a group of files (for example, a Java controller class and JSP pages) that implement the flow of a portion of user interface. When a user accesses a Uniform Resource Locator (URL) in the page flow, an instance of a page flow controller class is created and remains in existence until the user exits the page flow. The page flow controller can maintain state information for use by the controller's methods.

In some embodiments, a page flow explorer provides a consistent means of locating and managing all artifacts (components or files) related to a given page flow via graphical and code-level tools to simplify the development cycle, whether editing the page flow controller files or the member pages. The graph view of the explorer can be presented as a page flow graph (tree) that consolidates functions previously dispersed among the project tree, structure pane, data palette, property sheet, design palette, controls, and action view. The source view of the explorer presents syntax completion, validation, and other programmer's aids reduce the amount of work required to get the application running. Each artifact is represented by a node in the page flow graph. While the explorer view of the page flow is useful for doing basic management of the page flow related artifacts, it lacks features necessary to support editing of the page flow.

Abstract Component Model

In accordance with one embodiment of the present invention, the abstract component model infrastructure can coalesce updates from different application threads and various sources such as file systems, compilers and user inputs into one cohesive and central action to achieve the efficiency and robust for the dynamic updates in the environment of implementation and deployment of applications and/or Web-based services.

In accordance with one embodiment of the present invention, the abstract component model infrastructure can be used to provide a stateful model, without needing to re-implement details such as event listening, lifecycle and update management, etc. An implementation can provide the objects that make up the model, some logic to listen to "the outside world" and recognize when an update is needed, and a "builder" which can generate a lightweight version of the model based on the current "state of the world." It can optionally provide logic to update the artifact(s) that it is based on.

As shown in FIG. 1, an implementation of the abstract component model framework 100 in accordance with some embodiments of the present invention can be made up of one or more of the following key components:

Specialized component model 101, which can extend the abstract component model base class. Each model can have one primary artifact that it is based on.

Model objects 102, which can extend the abstract model object. These can be the actual representations of the thing (nodes) being modeled. Each model object can have a set of attributes, which can normally extend an attribute base class that can manage the model object's state, and can fire events when that state changes.

An event adapter 106, which can extend the abstract external event adapter, and can be responsible for listening to changes in an Integrated Design Environment (IDE), and starting an update when an environment change is detected.

A structure builder 107, which can be responsible for creating a lightweight set of objects based on the current state of the editor or environment, that can be used to update the model. These are generically referred to as "structure objects 112."

A singleton or static model manager 105, which can be responsible for handing out a model based on an action/artifact 103. For a non-limiting example, a model may be associated with a file 109, so a caller can request the model for that file 109. The manager can ensure that there is only one model created per artifact represented by, e.g., a node in a page flow, and they can be cached in weak references so that they can be garbage-collected when they are no longer needed.

In some embodiments, the base classes of the abstract component model provide at least one or more of the following generic functionalities:

The base class can manage the objects that belong to the model, as well as any listeners to the model. It can be responsible for the lifecycle of those objects, and provides some generic accessors for retrieving them.

The objects in a model can be instances of abstract model object, wherein each model object knows how to create or update itself from a lightweight structure object. Model objects also can have "child" objects, which is not really exposed but is used during a model update. The base abstract model object also provides the concept of an "attribute", which is used to contain state. During an update these attributes are updated based on a structure object, and the attributes themselves know how to fire events when they change.

The design can include a base external event adapter, which manages updating the model based on changes to the environment. It can provide a way to coalesce multiple events into one update, to reduce potential churn when event listeners must respond to an event. When an implementation detects a change, it can queue an update, which creates a lightweight representation of the model, and then hands that to an updater class that is responsible for taking these structure objects and merging them into an existing model.

In some embodiments, one underlying rule of the abstract component model can be that the state of the model should only be changed during a model update. If the model wants to present itself as "writable", any write methods can update the underlying artifact; the event adapter can then detect the change, and update the model accordingly. The state of the model can only change in response to underlying artifact changes. These write methods can be generally referred to as "request" methods, and take the form of, for non-limiting examples, "requestSetFoo", "requestNewFoo", etc. This way, changes that originate from model request methods can be handled exactly the same as changes from some other event (i.e. a user typing in a source file), which greatly reduces the complexity of keeping the model in sync with the underlying artifact(s).

One embodiment of the present invention is a computer enabled abstract component model system 100 for applications and Web-based services that comprises a abstract component model 101 to represent one or more artifacts 103 to be modeled; an event adapter 1060 to listen to a relevant environment change 110 and start an update to the abstract component model when the relevant environment change is detected; a structure builder 107 operable to build one or more structure objects 110 based on the relevant environment change that can be used to update the abstract component model 101; and a model manager 105 adapted to provide the abstract component model 101 to a caller.

In another embodiment of the present invention, the computer enabled abstract component model system 100 can further comprise another abstract component model to represent the artifacts to be modeled. In yet another embodiment of the present invention, the computer enabled abstract component model system accordingly can further comprise another abstract component model to represent other artifacts to be modeled.

In some embodiments of the present invention, an abstract component model 101 can manage one or more model objects 102 and the model objects can have child model objects. In addition, the model objects 102 can have attributes and the attributes can know how to fire events when they change. The attributes of model objects 102 can be updated based on structure objects 112.

In some embodiments of the present invention, the event adapter 106 can listen to the environment and know what events are important to respond to. The relevant environment change can be a change to a file on a disk or a type system. In addition, the event adapter can coalesce multiple events into one update, increasing efficiency with no discernable consequence to the end user. The abstract component model 101 can manage one or more event listeners 110 to the abstract component model. The event adapter 106 can also listen to the relevant environment changes in an Integrated Design Environment (IDE).

In some embodiments of the present invention, the structure objects 112 can be light weight objects. In some embodiments of the present invention, the structure objects 112 can be created based on the state of environment and can be a "snapshot" representation 111 of how the abstract component model 101 should look like after being updated. These structure objects can be temporary, or cached for performance in subsequent updates.

In some embodiments of the present invention, the structure objects 112 can have child objects. More specially, the structure objects 112 can be created to mirror the parent-child relationships of the model objects. There can also be a structure root that can track a list of dependent models.

In some embodiments of the present invention, the model manager 105 can operate to instantiate the abstract component model 101 from the plurality of artifacts 103 and call to activate the event adapter 106.

In some embodiments of the present invention, the computer enabled abstract component model system 100 can further comprise a model updater 108 operable to update each of the plurality of model objects 102 after they are created. In one example, the model updater can update the model objects based on the structure objects 112.

Lifecycle

In some embodiments, when a caller request an abstract component model from a model manager 105 for the first time, the model manager 105 can instantiate the model from the artifacts 103, and call to activate the event adapter 106 before handing it back. This can call the model implementation and tell it to instantiate its external event adapter implementation, and have it start listening to the environment. It can also queue an initial update of the model. Because this update can happen asynchronously, the first caller can receive an "empty" model. This approach of asynchronously updating a new model can yield performance and responsiveness benefits. In one embodiment of the present invention, a blocking version can be implemented for situations where that is more beneficial or necessary.

In some embodiments, the update cycle can contain at least two phases—a structure build phase, and an update phase. During the structure build, the lightweight version of the model 111 can be created based on the state of the environment. This can be completely implementation dependent; some models may use a previously-cached set of data structures; others may re-create them each time. The lightweight version of the model 111 can be a "snapshot" representation of how the model should look after being updated.

In some embodiments, the implementation of the abstract external event adapter 106 can run the structure build phase on a background thread, since it can potentially be expensive. There can be safeguards in place to ensure that changes which happen during this phase will not be lost. There can be a structure root that tracks a list of dependent models, and if any of these models change, it can mark itself as "stale". Also, if another update is queued while a structure build is happening, that current structure build can be cancelled in favor of the new one. In either case, a new structure build can start, and the results of the old one can be discarded. In one embodiment of the present invention, by discarding and recreating structures as necessary, these events can safely arrive on arbitrary application threads, without raising the concern of thread safety. This can be because no action will be taken on the announcing thread except to alert the structure builder to the need to discard any work in progress and start over again. If read locks are provided for models, the structure builder 107 can take responsibility for taking a read lock on external models. In one embodiment of the present invention, the only constraint on the structures can be that they are wrapped in a model structure root object, which provides context such as whether or not the environment is in a valid state, etc. They can also mirror the parent-child relationships of the model objects themselves.

Figure 2:
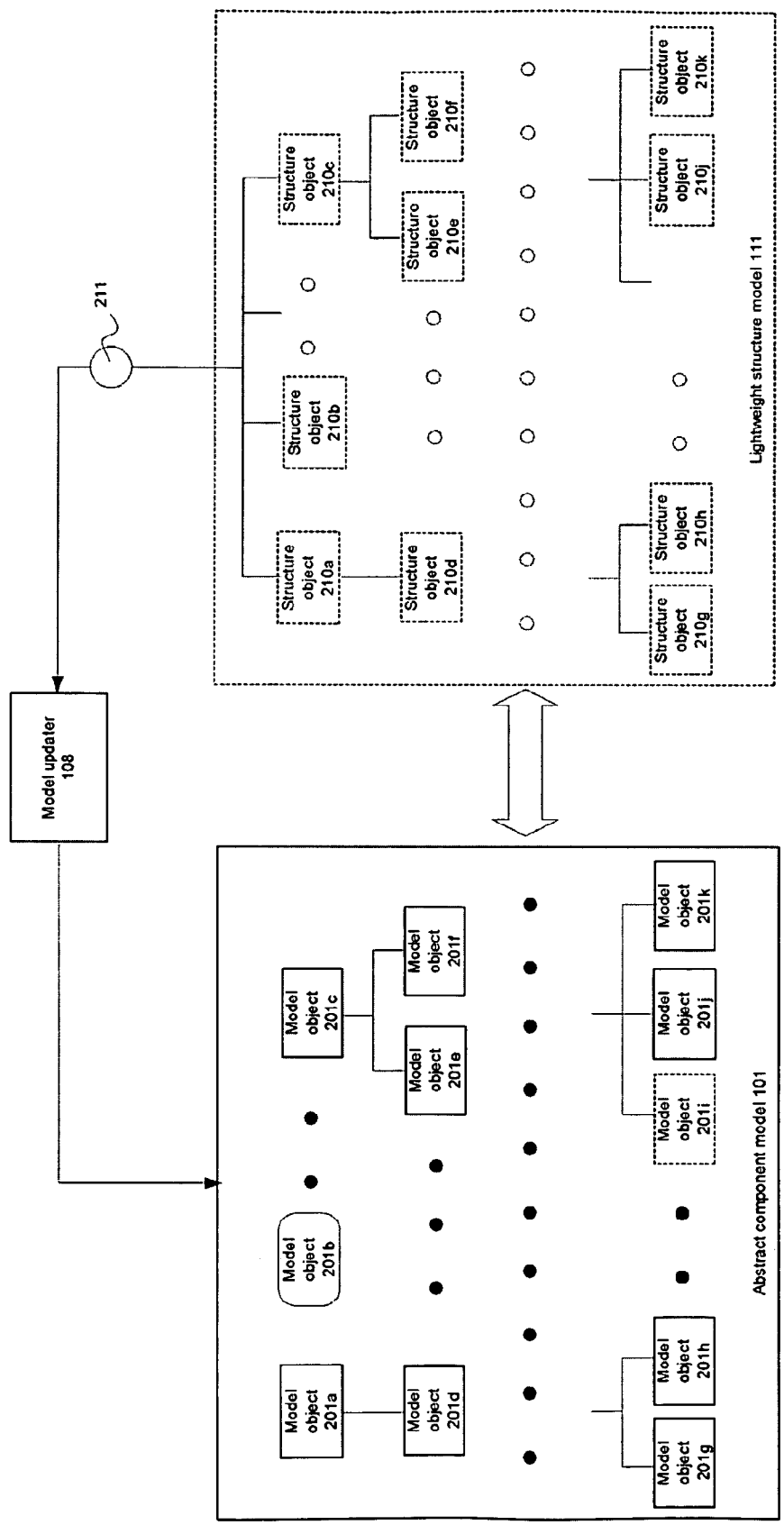
FIG. 2 is a flow chart illustrating an exemplary request call and updating process in the abstract component model framework in accordance with one embodiment of the invention.

For example, as further shown in FIG. 2, the model updater 108 can update the model 101 in a top-down, depth-first fashion. After the structures 111 are created, the model structure root 211 can be handed to the model updater 108. The model updater 108 can then match the top level structure objects 210a and 210c to the top level model objects 201a and 201c, and instructs each model object 201a or 201c to update itself based on the structure 111. For example, the logic to match a model object 201a to a structure object 210a can be provided by the model object 201a itself, and can be usually based on all the uniquely identifying attributes of that object. If a model object 201b does not yet exist, it can be created, based on the structure object 210b. In one embodiment of the present invention, the update can continue, depth-first, such that the children of that object can be created or updated; and then their children; and so on. In one embodiment of the present invention, at the end of the update, any objects, for example 201b, that are in the abstract component model which were not created or updated during that cycle are removed from the model and disposed.

The structure build phase of an update may seem like added complexity, but it actually can simplify the update cycle considerably. The structure build phase can be reduced to creating a "snapshot" of the environment 111, as a set of data structures that represent what the model should look like at the end of the update. Then the rest of update can become simple since everything can have been calculated at that point. In one embodiment of the present invention, all that needs to happen can be for the structure objects 112 to be matched up to the model objects 102, and for the model objects 102 to update themselves based on the structure objects 112.

In some embodiments, attributes of the model objects can change during the update phase, and model objects 102 can be created or deleted. When any of these events happen, the model itself 101 can fire an event to the listeners 110. If model object implementations use the base attribute class, any event firing will be handled for them as the values of attributes change.

Once the model 101 is initialized, the event adapter 106 continues to listen to the environment. It is the responsibility of the event adapter implementation to know what events are important to respond to, so that the model is kept up to date, but is not un-necessarily updated.

In some embodiments of the present invention, the model updater 108 can generate a model update set after updating each model objects. For example, after an object is updated, the updater can request a list of ChildUpdateSets from the object, based on the structure. The model update set can compromise one or any combination of a current list of child objects of each type; a list of structure objects that should be used to update or create objects of each type; and a factory to create new objects based on a structure.

Request Call Details

One embodiment of the present invention is a computer enabled abstract component model system 100 that can further comprise a request runner 104 operable to inform the abstract component model when to start and/or stop the update. In one example, the request runner 104 can be capable of grouping nested calls into a single edit transaction. In another example, the request runner 104 can be nested itself. The nested request runner can be capable of self-detecting and will not try to start a different edit transaction.

In some embodiments, a request call can be implemented using a request runner 106, which can be basically a Runnable interface implementation that knows how to group nested calls into a single edit transaction by telling the model when to start and end an update, and by taking a lock on the model itself How an edit transaction is handled can be up to the model implementation; in most cases starting an edit can involve making sure a file is writable and starting some sort of undo transaction. Ending an edit can usually involve committing any changes that were made during the edit.

In some embodiments, the request runners can be nested, for a non-limiting example, a model object's request call might create a request runner that makes a few changes, and then makes request calls on other model objects. The nested request runners can detect that they are nested, and do not try to start another edit transaction. In one embodiment of the present invention, request runners can always run on the Standard Widget Toolkit (SWT) display thread, to avoid conflicts with model updates and other request calls, or with underlying data that assumes it will be modified by a user transaction.

In some embodiments, most request calls can be implemented using the base request runner class, but in some other embodiments, it can make sense to subclass the base request runner class. An example is a model that represents multiple files: certain request calls may only require one file to be editable, so the request runner's "validate edit" method can be overridden to only validate that file, instead of each file the model represents. If client code wants to make multiple request calls within a single edit transaction, an interface can be provided for that purpose. The caller can implement this interface, and then pass that request instance to the model, which will wrap it in a request runner and execute it. Note that although this works in many cases, its usefulness may depend on the model implementation. For a non-limiting example, it can be usually impossible to create an object, and then do something with that object within a single request; because the model can be locked for the duration of the request, and the object will not be created until the request is finished.

In some embodiments of the present invention, multiple request runners can be operable to be included in one edit transaction by a caller. More specifically, an interface can be used operable to include multiple request runners in one edit transaction. In some embodiments of the present invention, the request runner 104 can run on a SWT display thread.

In some embodiments, the Request Runner calls 104 can return a status object with an embedded exception.

In some embodiments of the present invention, the abstract component model 101 can be used to drive an editor. For example, the editor can be one of: a visual design surface, a wizard, or a page flow, or something else.

Figure 3A:
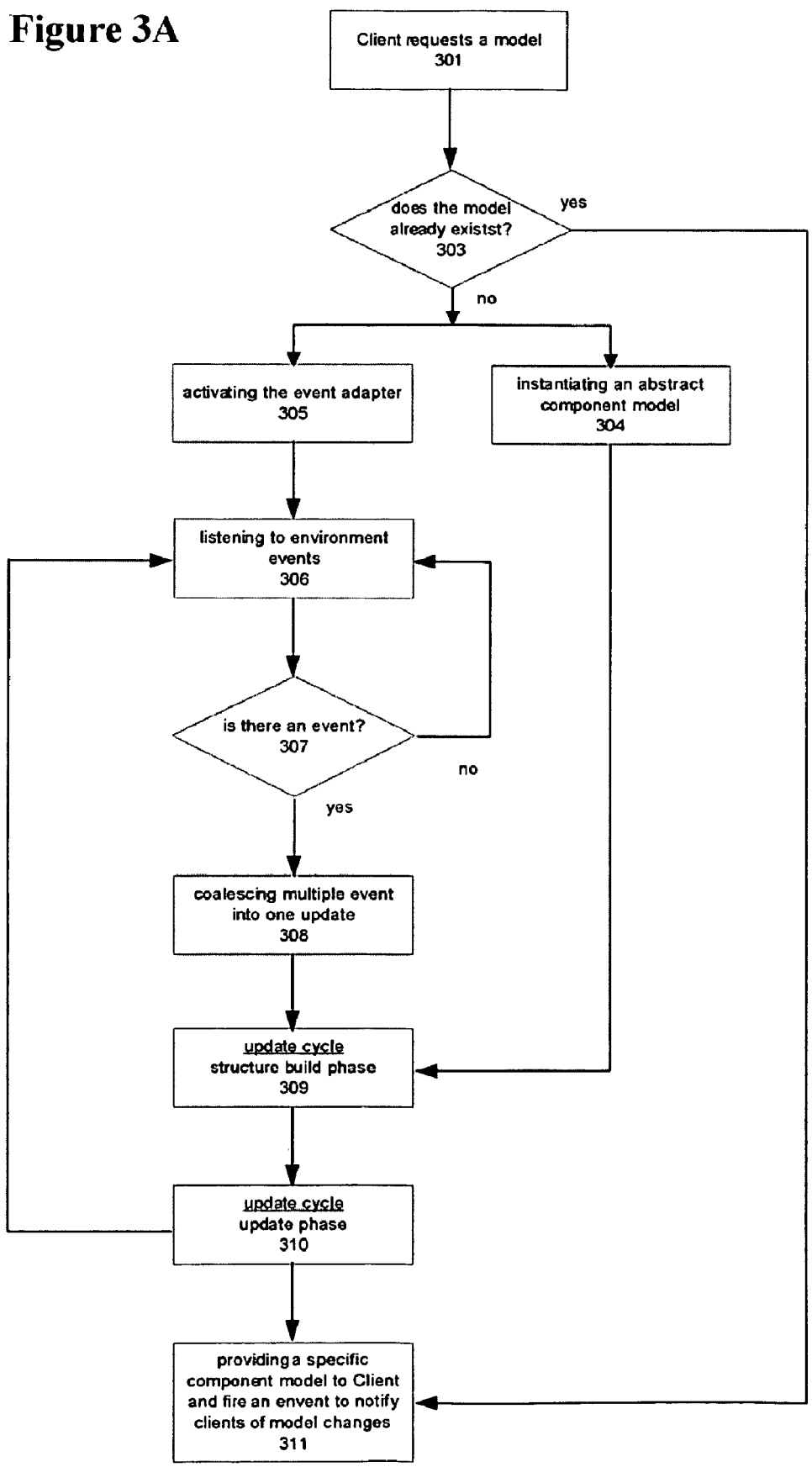
FIG. 3A is an exemplary illustration of creating abstract component model in accordance with one embodiment of the present invention.
Figure 3B:
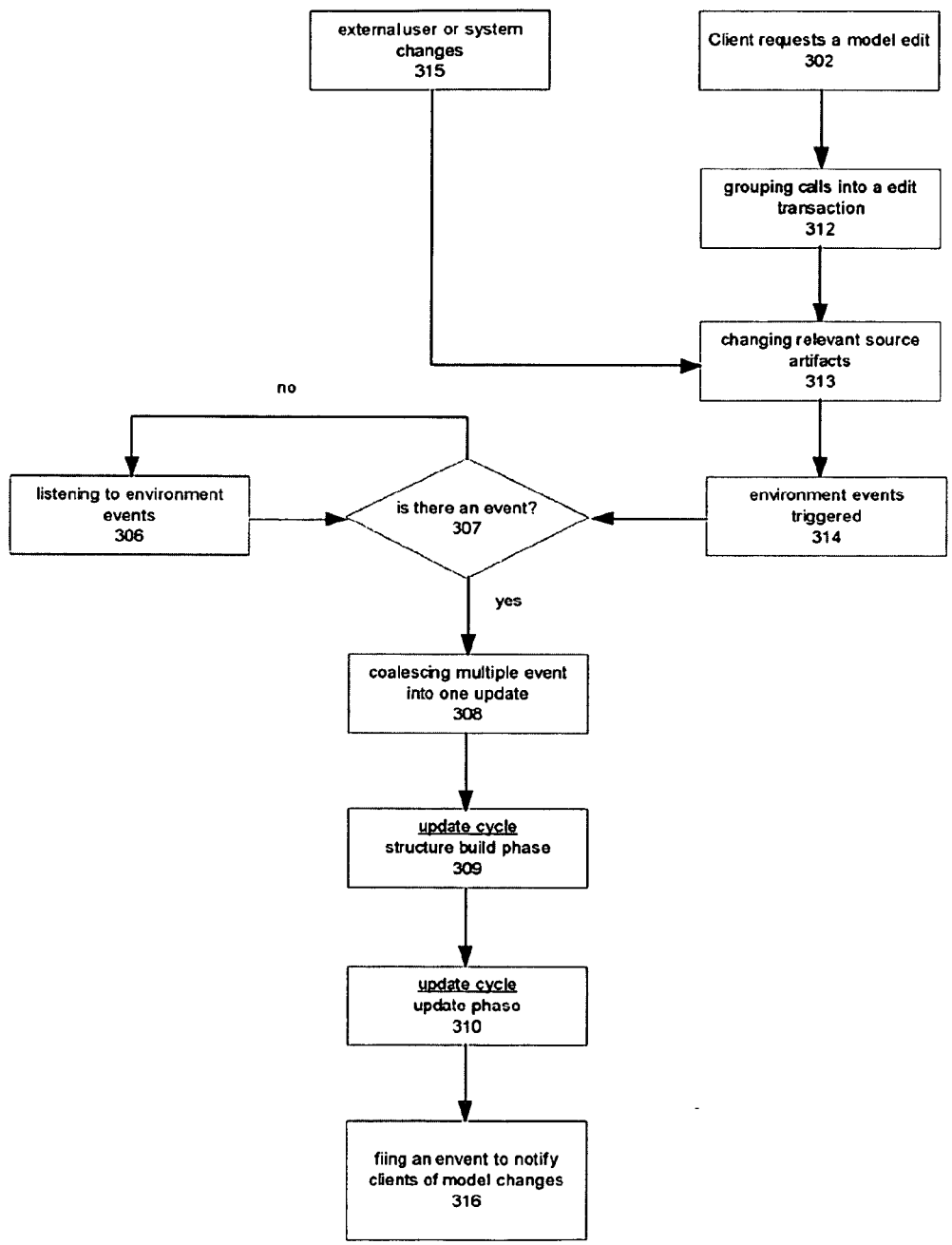
FIG. 3B is an exemplary illustration of updating abstract component model in accordance with one embodiment of the present invention.

As shown in FIGS. 3A and 3B, one embodiment of the present invention is a method to support an abstract component model for applications and Web-based services which comprises: listening to an environment change 306 and starting an update to a abstract component model that can represent one or more artifacts to be modeled when the environment change is detected 307; building structure objects based on the environment change 309; updating the abstract component model using the structure objects 310; and providing the abstract component model to contain and support the model objects 311.

In some embodiments of the present invention, the method can further compromise a step of receiving a request call for a model from a caller 301.

In some embodiments of the present invention, at step 303—if an abstract model exists, a specific component model can be provided to the client and an event can also be fired to notify all clients of the model 311.

In other embodiments of the present invention, also at step 303—if an abstract model does not exist, the method can further compromise a step of instantiating an abstract component model from the artifacts 304 for the first time call. Also, the method can further compromise a step of activating the event adapter to listening to the environment 305 for the first time call. In some embodiments of the present invention, the method can further compromise a step of coalescing multiple events into one update 308. As an example, the update can be started only when important events are detected.

In some embodiments of the present invention, the method can further compromise one or more of: creating or deleting the model objects during an update phase 310 of an update cycle of the abstract component model; changing attributes of the model objects and creating or deleting one or more of model objects during the update phase 310; and changing the abstract component model only during the update phase 310.

In some embodiments, there can also be steps of receiving a request call for an edit on the model 302 and firing an event to notify clients of model changes 316. The method can further compromise grouping nested calls into a single edit transaction 312. As an example, an interface can be used to group multiple calls into a single edit transaction.

In some embodiments, there can also be a step of changing relevant source artifacts 313 after receiving a call for an edit on the model 302. In addition, the artifacts can also be changed by an external user or through system changes 315. In some cases, at step 313, if the artifacts are not allowed to be changed or updated for reasons such as read-only file or file deleted, the method can prevent any changes or updates on the model to ensure the consistency between the model and the artifacts that are associated with the model. In some case, it is important to always change the artifacts before the model.

One embodiment of this component model can batch up (temporarily store) events resulting from performing and update of the model object based off of structure objects. Then after the update is finished, the model framework can fire those event notifications to listeners. This has the benefit of firing multiple events that when clients respond, they can see a fully updated view of the model rather than a partially updated view of the model which is still in the process of updating, which could very likely not appear self-consistent.

One embodiment of the present invention is a machine readable medium having instructions stored thereon that when executed cause a system to listen to a relevant change and start an update to the abstract component model can represent one or more artifacts when the relevant change is detected; build structure objects based on the relevant change; update the abstract component model using the structure objects; and provide the abstract component model to contain and support the plurality of model objects.

Various embodiments of the present invention enable an abstract component model, which can be used to drive an editor by providing an underlying stateful model for component implementation without the need to re-implement details, such as event listening, lifecycle and update management, etc. Here, the editor can be but is not limited to a visual design surface, wizard, or a page flow as discussed later. An implementation needs to provide objects that make up the model, some logic to listen to environmental changes and recognize when an update is needed, and a builder which can generate a lightweight version of the model based on the current "state of the world." In addition, it can optionally provide logic to update the artifact(s) that it is based on. Here, the environmental changes can be but is not limited to changes to files on disk or type system changes.

In some embodiments, a clean way, for example at the model's implementation level, can be implemented to enable models to be dependent on each other without deadlocking, and without too much churn as they initialize. In such an example, dependencies between models can be reduced, and avoid a lot of unnecessary update churn.

In some embodiments, the Structure Builders 107 can take whatever resource locks are necessary during their build phase and the build job may not need to use scheduling rules.

Page Flow Editor

Figure 4:
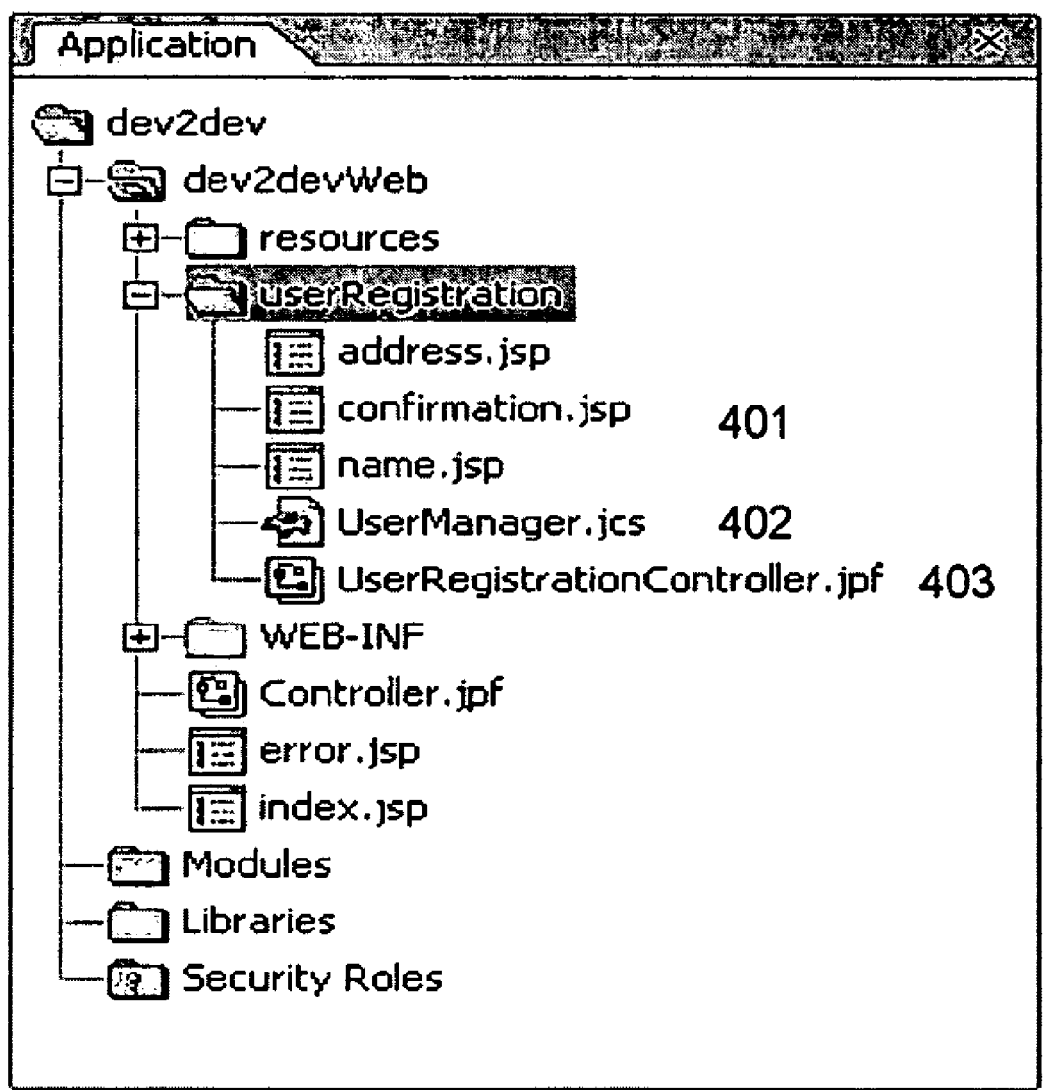
FIG. 4 is an illustration of an exemplary page flow implementing a Web application's user registration wizard feature.

In some embodiments, the abstract component model can be used as an underlying model to support a page flow, which is a directory of Web application files that work together to implement a user interface (UI) feature. The page flow allows a software developer to separate user interface code from navigational control and other business logic. For a non-limiting example, a page flow could implement a Web application's user registration wizard feature. The files of such a page flow could be arranged in an exemplary "userRegistration" directory shown in FIG. 4, which contains several *.jsp files 401, a *.jcs file 402 and a *.jpf file 403. The *.jsp files are standard Java Server Pages (JSP) files that contain markup that describes the visual aspect of the user registration wizard. The *.jcs file contains annotated Java code that implements logic used by the user registration wizard. The *.jpf file contains annotated Java code that implements the navigation and state management logic of the user registration wizard and that makes calls to business logic.

Various embodiments of the present invention enable a three-pane page flow editor optimized for viewing and editing a page flow. It centers around a selected current node in the page flow, shows details and allows editing in the vicinity of the node. It integrates two complementing design views: the flow view that presents a fairly complete picture that emphasizes connections between the page flow entities (nodes), and the action view that presents an orderly arrangement of page flow entities, including controls. It provides a visual representation of nodes and the connections among them, enabling the ability to read and edit connections between nodes in a local area of the page flow without the overlaps between lines and crossovers once the page flow grows complex in real applications. Consequently, user can edit a page flow via dragging and dropping of entities instead of switching back and forth between the two design views, or a design view and source view. In addition, the page flow can be supported by an underlying abstract component model.

Various embodiments of the present invention provides at least the following capabilities for the page flow editor:

A clear local picture of inputs and outputs for a given node, uncluttered by irrelevant nodes and links.

A canned, standardized layout where every link is easy to locate, select, and edit.

A place to put additional details, such as global forwards raised by an action, that would otherwise unduly clutter the main view.

A way to dynamically trace paths through the flow using in a sequential frame presentation, similar to time-based media editors.

A unified context for editing both JPF and JSP files.

A means of quickly navigating to various source artifacts that make up a page flow.

An integration with source view for a less disjointed overall editing experience.

Figure 5:
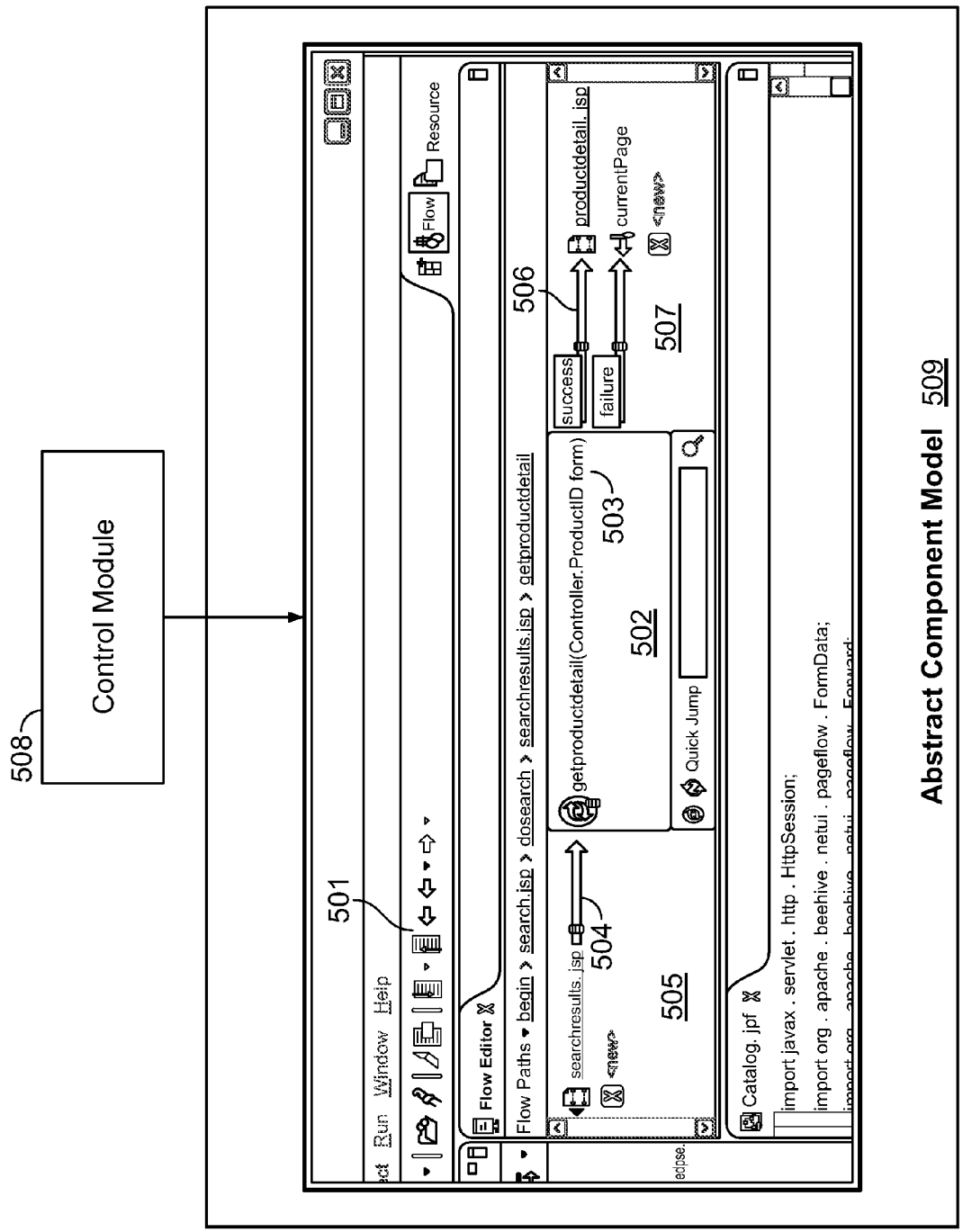
FIG. 5 is an illustration of an exemplary page flow editor in one embodiment of the present invention.

FIG. 5 is an illustration of an exemplary page flow editor in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 5, the central section (pane) 502 of the page flow editor 501 shows details of the current node 503 and navigation in the flow editor is based on bringing a given node into view in this central section. Initially, the current node is the begin action when editing a page flow. It is, in essence, the "home" node for a page flow, much like a "home" page on a Web site. The upstream 504 and downstream 506 connections (links) and nodes of the current node in the page flow are shown in the sections to the left 505 and right 507 of the center section, respectively. In addition, the left and right sections provide locations for creating additional links, reconnecting existing links, or deleting existing upstream links upstream or downstream. The entire page flow editor is supported by an independent control module 508 of this view, which provides navigational control and other business logic to support the page view on top of it.

Figure 6:
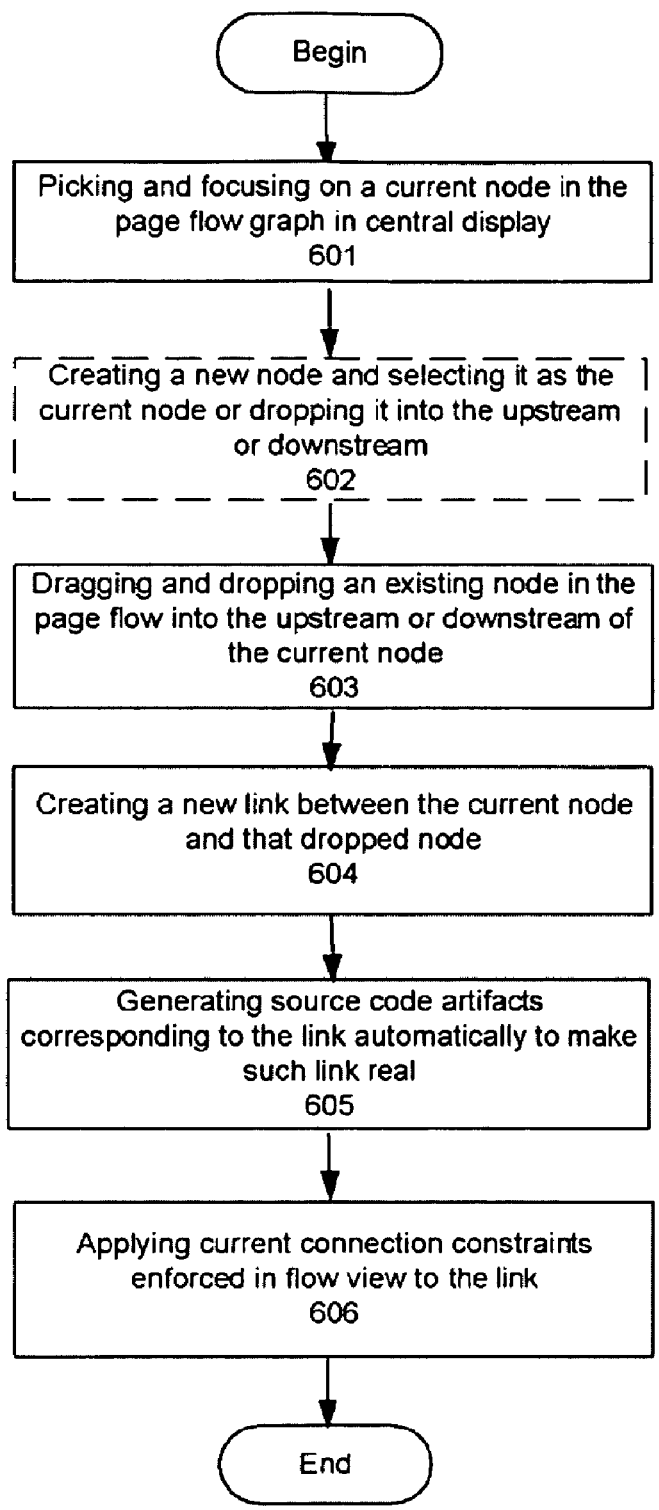
FIG. 6 is a flow chart illustrating an exemplary page flow editing process via in accordance with one embodiment of the invention.

FIG. 6 is a flow chart illustrating an exemplary page flow editing process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 6, a current node in the page flow graph is picked and focused on in central display at step 601. Optionally, a new node can be created before it is selected as the current node or dropped into the upstream or downstream section at step 602. An existing node in the page flow can be dragged and dropped into the upstream or downstream of the current node at step 603, and a new link can be created between the current node and that dropped node at step 604. Dragging the node into the downstream means the dropped node is the destination end of the link, while dragging the node into the upstream means the dropped node is on the source side of the link. Source code artifacts corresponding to the link are generated automatically to make such link real at step 605 and current connection constraints as enforced in flow view is applied to the link at step 606.

In some embodiments, nodes that are inherently terminal and can only have a single upstream reference, which include but are not limited to, return node, an exit node, a mystery node, can never be the current node; they only appear in the downstream section. Nodes that are inherently terminal but support more than one upstream reference —such as a shared flow action, external page flow, or external page—are allowed as focal nodes since this is the only way to easily see all the nodes that refer to them.

In some embodiments, a user can move upstream or downstream in the page flow following path through the graph by clicking the link portion of an upstream or downstream node. The clicked node then becomes the new current node and is displayed in the central section. A user can also jump to other nodes in the page flow by specifying the name of the node to jump to, or dragging a node from the page flow tree and dropping it into the central section.

In some embodiments, a user can reattach a link via a context menu on the link itself, or by dragging and dropping of the new destination node onto the existing destination node. An existing link to the current node can also be deleted in the similar manner. The node in the upstream or downstream section, however, should be removed from view since it no longer has an association with the current node.

In some embodiments, the page flow editor supports the displaying of source code and/or the annotation metadata of the corresponding artifacts (nodes), wherein the artifacts and the links to the nodes in the page flow view is automatically updated to be in sync with any change made in the source code.

In some embodiments, several artifacts can be registered with the page flow if they are dragged from the project tree, although most drags onto the page flow editor originate from the page flow. Such artifacts include but are not limited to, external pages, html files, plain text files, other existing page flows, controls, shared flow and message bundles.

Figure 7:
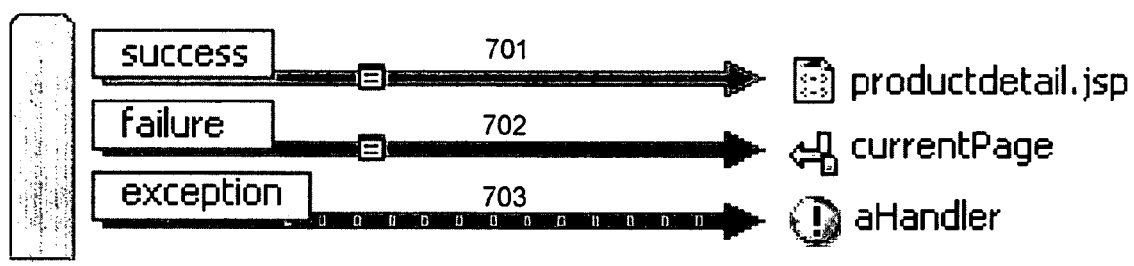
FIG. 7 is an illustration of different types of links in a page flow editor in one embodiment of the present invention.

In some embodiments, the page flow editor makes distinction among different link types, showing different representations of forwards (success) 701, validation error forwards (failure) 702, and catches (exception forwards) 703 as shown in FIG. 7. The states of the links such rollover and selection states can be associated with the corresponding links.

Figure 8A:
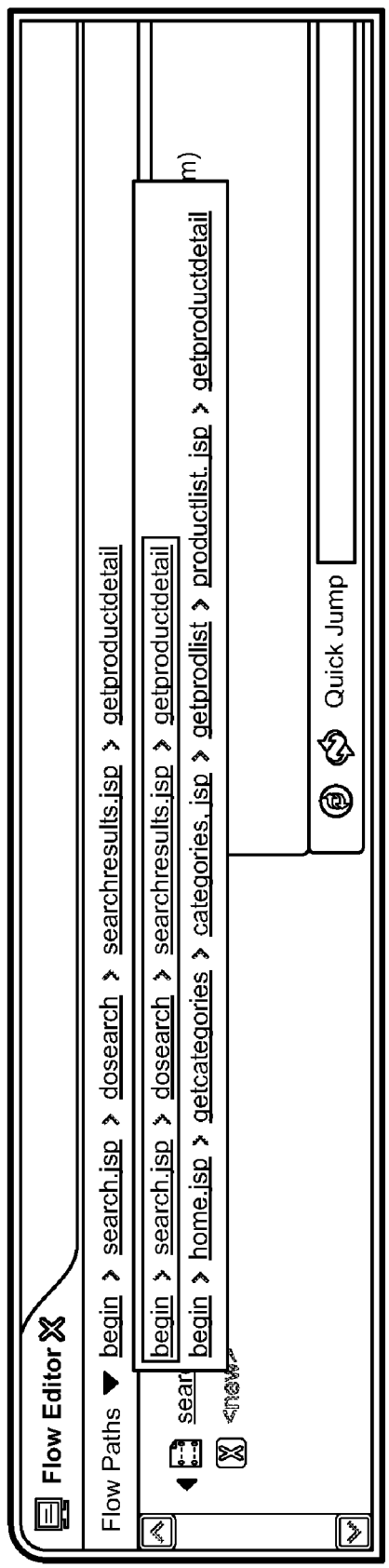
FIGS. 8A and 8B are illustration of an exemplary flow path graph in one embodiment of the present invention.
Figure 8B:
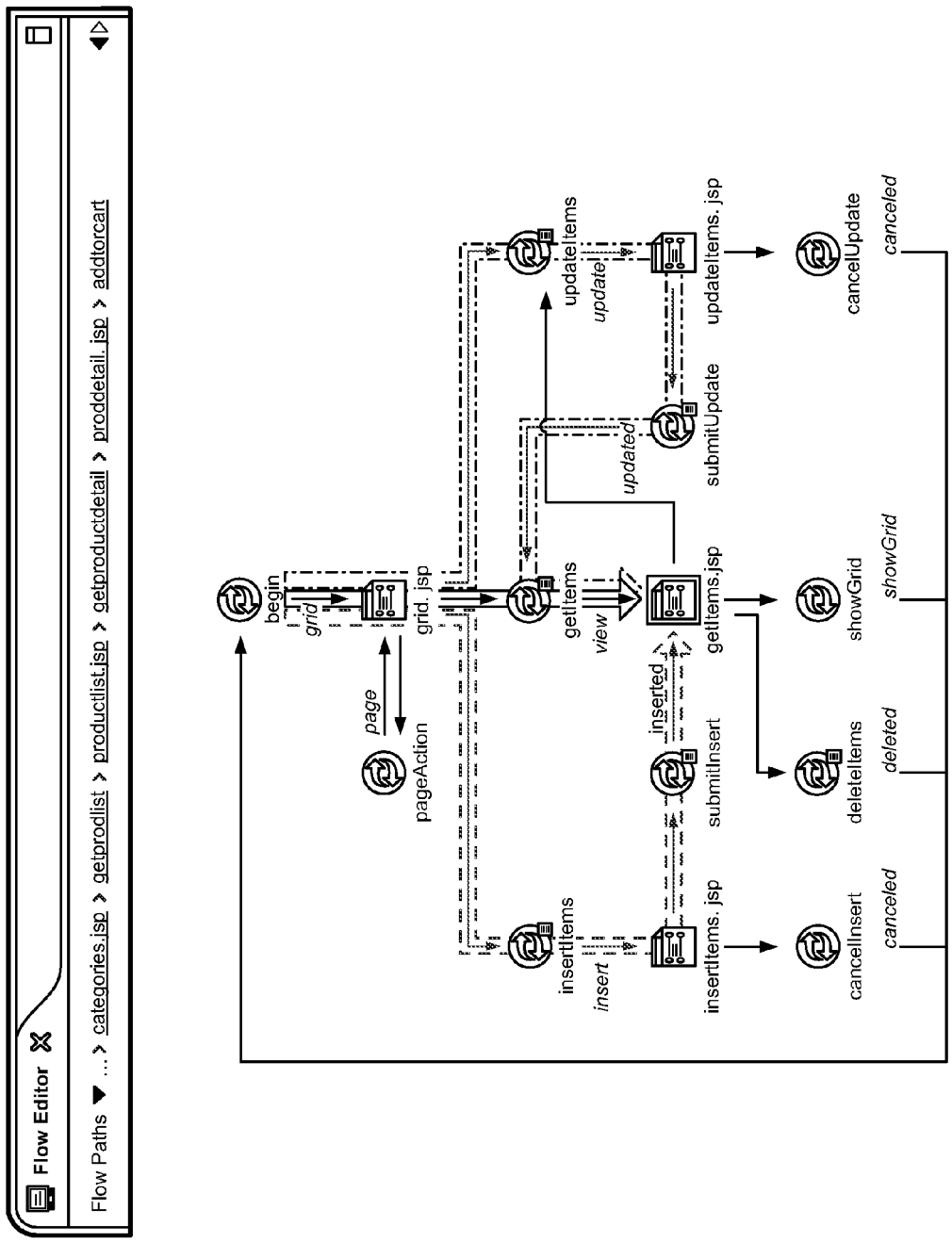

In some embodiments, the page flow editor also supports a flow path section of the editor, which displays the path(s) from the begin node in the page flow to provide additional context around the current node as shown in FIGS. 8A and 8B. It also provides a quick means of navigating upstream by allowing the user to select which path to display. The selected path is then rendered as a set of links.

In some embodiments, the page flow editor also supports a plurality of node types as listed below:

Return Nodes. These nodes reflect the NavigateTo attribute on an annotation, providing for symbolic navigation.

Exit Nodes. These nodes reflect the returnAction attribute on an annotation in a nested page flow. It designates the action to be raised in a nesting page flow upon a particular completion path of the nested flow.

Mystery Nodes. These nodes reflect an empty path attribute on an annotation.

In some embodiments, the page flow editor supports refactoring across multiple programming languages and files. Once a node in the page flow is renamed, the underlying model of the page flow editor will fix references to the node across files and languages in the page flow so that every reference to the node is in sync. Such cross file and platform refactoring is performed transparent to the page flow display and the user.

Seeing the Big Picture

Figure 9:
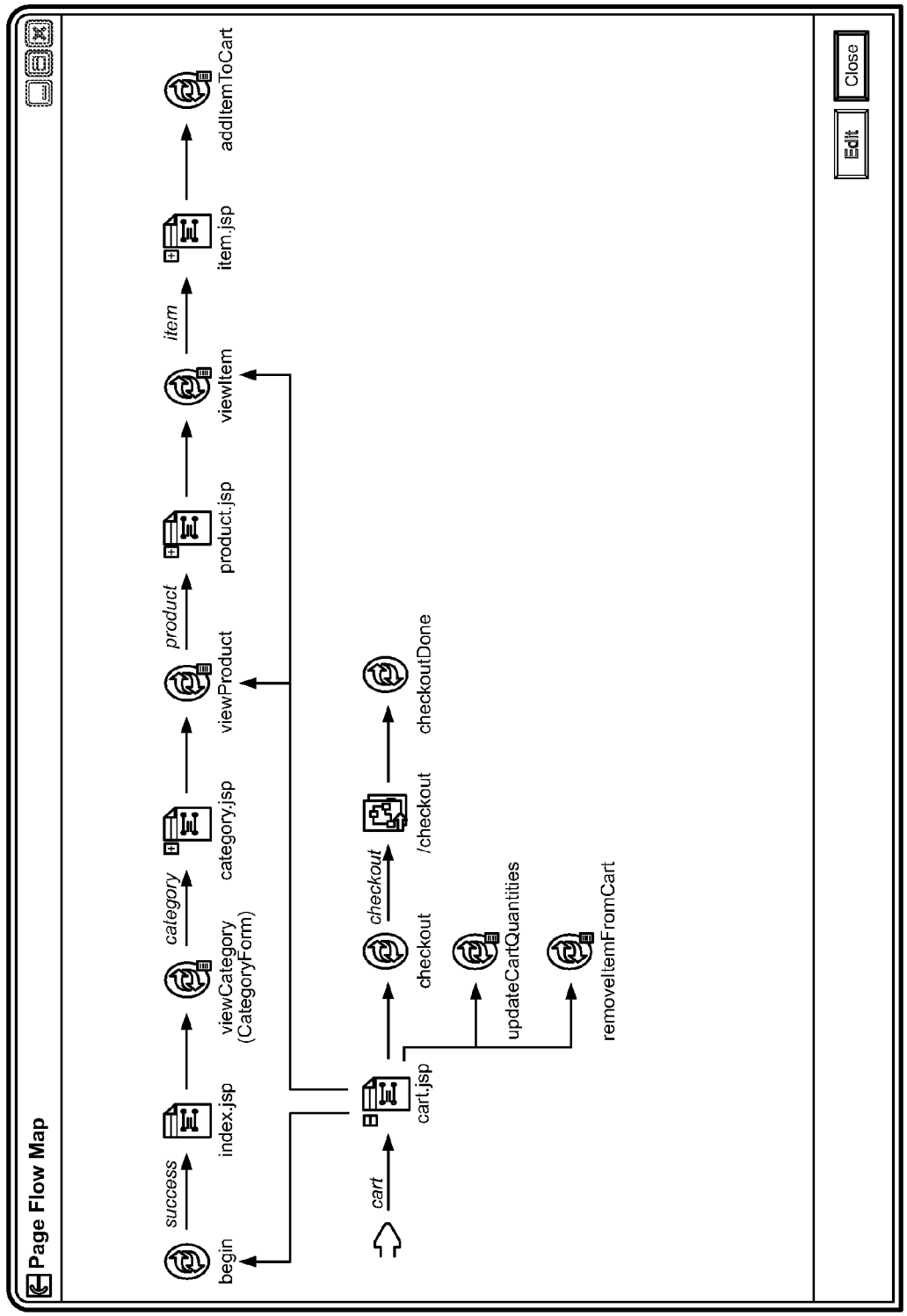
FIG. 9 is an illustration of an exemplary overview of a page flow in one embodiment of the present invention.

In some embodiments, the page flow editor provides the ability to view the overall structure of a given page flow being edited as a reference, in much the way that a site maps helps orient users to the overall structure and content of a Web site, so that a user can view the microcosm of the current node in its broader context as shown in FIG. 9. The overview is an automatically laid out read-only view of the entire flow that enables a user to clearly see all links and easily discern their source and destination nodes (though some of this information may be presented dynamically, based on user manipulation, rather than continuously). It can also be used as a selection mechanism for setting a node selected from the overview as the current node in the page flow editor.

The goal for the page flow overview is to automatically layout a rendering of the page flow structure that requires very little manipulation on the part of users in order to be readable. It provides user with the big picture as how to get to a certain point in the page flow via different possible paths. The principal paths through the flow can be identified and each of them plotted on a single, separate horizontal line. Links between the lines are initially hidden, but can be displayed via an expander widget on the source node. Cycles within a line are also hidden initially. The algorithm for laying out the graph is outlined as follows:

1. Calculating the longest path through the graph that has begun as the first node.
2. Plotting the "main path"—the longest path along the top of the canvas, starting with the begin node at left and proceeding to the right in a single line.
3. Downstreaming branches off of the main, i.e., nodes that are downstream from nodes in the main path, but are not themselves in the main path are plotted next, below the main path (the space above the main path will be used for showing link cycles within the main path). The longest branch off the main path should be plotted first, followed by the second longest, and so on.
4. Plotting any additional paths, longest first, starting with the "initial" node (the one that has no referring node), and running from left to right, on a new line below the main path and its branches.

Figure 10:
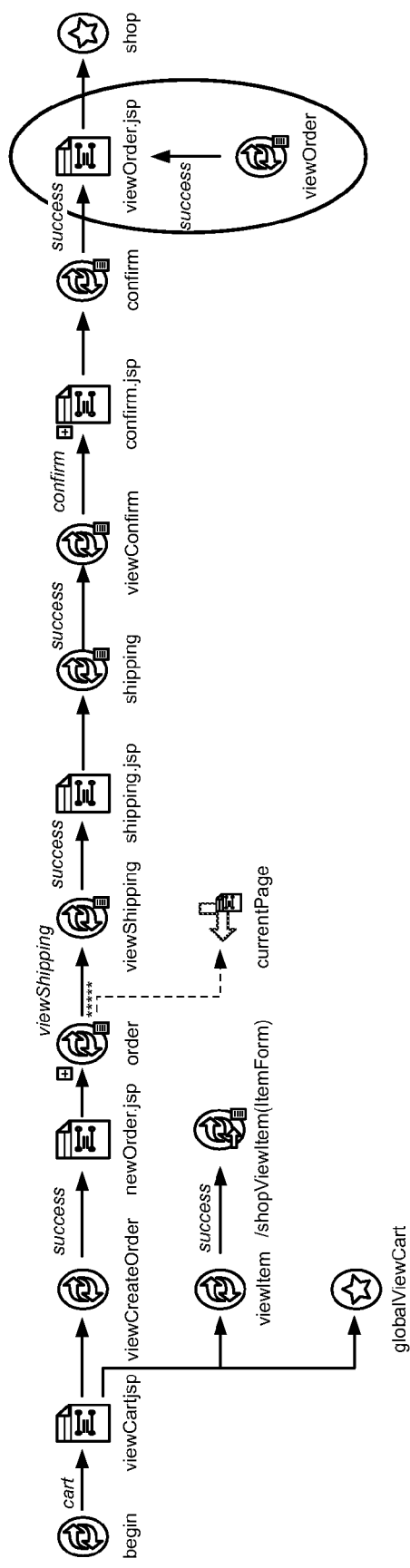
FIG. 10 is an illustration of an exception to the plotting of paths in page flow in one embodiment of the present invention.

The exception to the rule in Step 4 above happens when the path refers to nodes already plotted in one of the other paths and is relatively short compared to the path it refers to, as shown in the case of the "viewOrder" action node in FIG. 10. Under such situation, it makes more sense to place this node near the node it refers to rather than in the typical initial node position (at the far left of the canvas). Had this "path" consisted of four or five nodes however, it might make more sense to place the path on its own line, and have the initial node in the typical spot.

Figure 11:
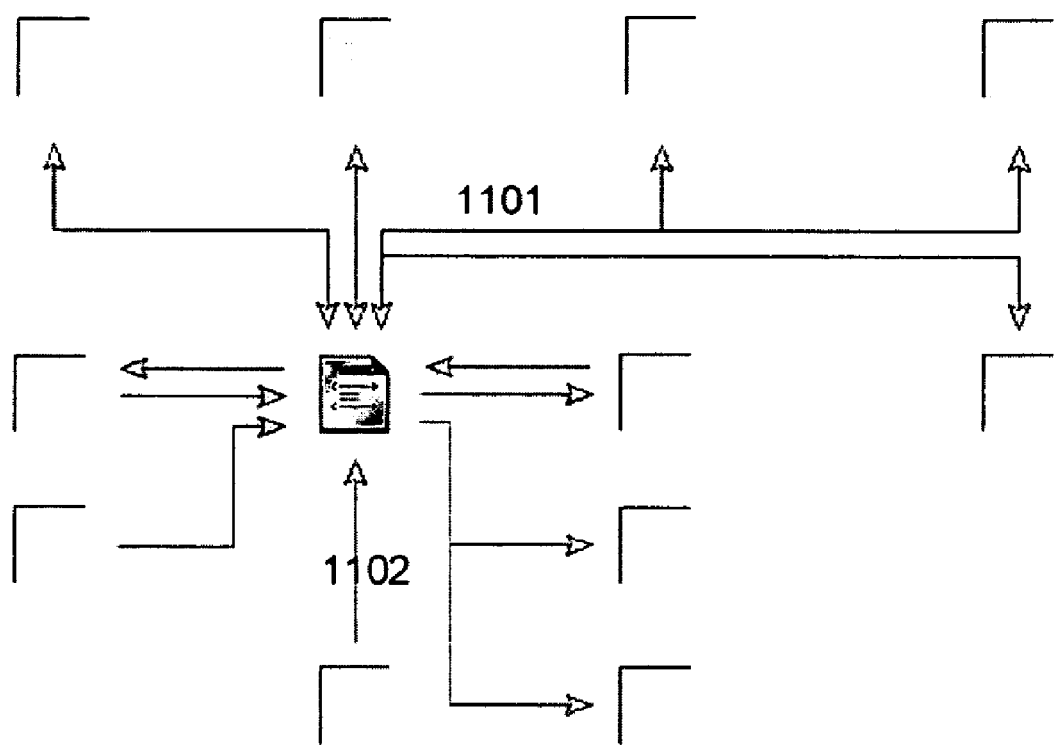
FIG. 11 is an illustration of exemplary routing links in page flow in one embodiment of the present invention.

FIG. 11 demonstrates some exemplary link routing behaviors, focusing mostly on nearby nodes in spots that will be commonly occupied, rather than providing much guidance on links that go across distant paths. Links 1101 represent routes for links that would not be shown initially, but only when users expand or collapse the relevant source nodes. Thus, while there may still be significant reuse of these link routes, and hence the potential for link overlap that is difficult to read, users may be able to substantially de-clutter the view by collapsing one or more source nodes whose links compete for the same link routes. On the other hand, links 1102 represent routes for links that would be plotted initially (when the corresponding nodes exist) and over which the user has no control. Consequently reuse of these routes is much more limited.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "model" is used in the embodiments of the systems and methods described above, it will be evident that such concept can be interchangeably used with equivalent concepts such as, class, method, type, interface, bean, component, object, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented abstract component model system for applications and Web-based services, comprising:
    an abstract component model to represent one or more artifacts to be modeled;
    an event adapter to listen to a relevant change and start an update to the abstract component model when a relevant change is detected, wherein the event adapter is operable to listen for the relevant change in an Integrated Design Environment (IDE);
    a structure builder operable to build one or more structure objects based on the relevant change that can be used to update the abstract component model;
    one or more request runners running on a Standard Widget Toolkit (SWT) display thread,
        wherein the one or more request runners are operable to inform the abstract component model when to start or stop the update,
        wherein at least one request runner is included in a first single edit transaction by a caller,
        wherein at least one of the one or more request runners is a nested request runner grouped with another request runner into the first single edit transaction, and
        wherein the at least one nested request runner is capable of self-detection and thereby operable to avoid starting an edit transaction other than the first single edit transaction; and
    a model manager adapted to provide the abstract component model to the caller.

2. The computer-implemented abstract component model system according to claim 1, further comprising: another abstract component model to represent: the artifacts to be modeled; or other artifacts to be modeled.

3. The computer-implemented abstract component model system according to claim 1, wherein: the abstract component model manages one or more model objects.

4. The computer-implemented abstract component model system according to claim 3, wherein: the model objects have child model objects and attributes, wherein the attributes of model objects are updated based on a structure object and the attributes know how to fire events when they change.

5. The computer-implemented abstract component model system according to claim 1, wherein: the abstract component model manages one or more event listener to the abstract component model.

6. The computer-implemented abstract component model system according to claim 1, wherein: the event adapter is capable of:
    coalescing multiple events into one update; listening to the environment and knowing what events are important to respond.

7. The computer-implemented abstract component model system according to claim 1, wherein: an update cycle of the abstract component model contains at least a structure build phase and an update phase.

8. The computer-implemented abstract component model system according to claim 1, wherein: the structure objects are light weight objects with child objects.

9. The computer-implemented abstract component model system according to claim 1, wherein: the structure objects are created based on the state of environment and is a "snapshot" representation of how the abstract component model should look like after being updated.

10. The computer-implemented abstract component model system according to claim 1, wherein: the structure objects are created to mirror the parent-child relationships of the model objects.

11. The computer-implemented abstract component model system according to claim 1, further comprising: a structure root that tracks a list of dependent models.

12. The computer-implemented abstract component model system according to claim 1, wherein: the model manager is operable to:
    instantiate the abstract component model from the plurality of artifacts; and call to activate the event adapter.

13. The computer-implemented abstract component model system according to claim 12, wherein: during the update phase, one or more of the following happens: the abstract component model is changed; the plurality of model objects is created or deleted; attributes of the plurality of model objects are changed;
    and one or more of the plurality of model objects are created or deleted.

14. The computer-implemented abstract component model system according to claim 1, further comprising: a model updater operable to: update each of the plurality of model objects after they are created; update the model objects based on the structure objects in a top-down, depth-first fashion; or generate a model update set after updating each model objects, wherein the model update set compromising one or any combination of: a current list of child objects of each type; a list of structure objects that should be used to update or create objects of each type; and a factory to create new objects based on a structure.

15. The computer-implemented abstract component model system according to claim 1, wherein: the abstract component model is used to drive an editor, wherein the editor can be one of: a visual design surface, a wizard, or a page flow.

16. A method to support an abstract component model for applications and Web-based services, comprising:

listening to an environment change in an Integrated Design Environment (IDE) and starting an update to an abstract component model that represents one or more artifacts to be modeled when a relevant environment change is detected in the IDE;

building structure objects based on the relevant environment change;

updating the abstract component model using the structure objects;

utilizing one or more request runners running on a Standard Widget Toolkit (SWT) display thread,
 wherein the one or more request runners are operable to inform the abstract component model when to start or stop the update,
 wherein at least one request runner is included in a first single edit transaction by a caller,
 wherein at least one of the one or more request runners is a nested request runner grouped with another request runner into the first single edit transaction, and
 wherein the at least one nested request runner is capable of self-detection and thereby operable to avoid starting an edit transaction other than the first single edit transaction; and providing the abstract component model to contain and support the model objects.

17. The method according to claim 16, further compromising:
receiving a request call from a caller.

18. The method according to claim 17, further compromising one of:
instantiating an abstract component model from the artifacts if an abstract component model does not exist;
grouping nested calls into a single edit transaction;
coalescing multiple events into one update; and
activating the event adapter to listening to the environment if not activated.

19. The method according to claim 16, wherein:
the update is started only when important events are detected.

20. The method according to claim 16, wherein:
an update cycle contains at least a structure build phase and an update phase.

21. The method according to claim 16, wherein:
the abstract component model manages one or more model objects, wherein the model objects are organized in a tree structure and the abstract component model is updated in a top-down, depth-first fashion.

22. The method according to claim 21, further comprising one of:
updating each of the model objects based on the structure objects;
generating model object update set after updating each of the model objects, wherein the update set generated by an updated parent model object can be used to update children model objects of the updated parent model object;
deleting from an abstract component model, at the end of an update cycle, all model objects if not created or updated during the update cycle.

23. The method according to claim 16, further comprising:
using the abstract component model to drive an editor;
creating or deleting the model objects during an update phase of an update cycle of the abstract component model;
changing attributes of the model objects and creating or deleting one or more of model objects during the update phase; and
changing the abstract component model only during the update phase.

24. The method according to claim 16, further comprising:
changing relevant source artifacts before updating the abstract component model to ensure the consistency between the source artifacts and the abstract component model.

25. The method according to claim 16, further comprising:
batching up events resulting from updates of model objects and firing the events after the updates are finished.

26. A non-transitory machine readable medium having instructions stored thereon that when executed cause a system to:
represent a plurality of artifacts to be modeled via the abstract component model;
listen to an environment change in an Integrated Design Environment (IDE) and start an update to the abstract component model when a relevant environment change is detected in the IDE;
build structure objects based on the detected relevant environment change;
update the abstract component model using the structure objects;
utilize one or more request runners running on a Standard Widget Toolkit (SWT) display thread,
 wherein the one or more request runners are operable to inform the abstract component model when to start or stop the update,
 wherein at least one request runner is included in a first single edit transaction by a caller,
 wherein at least one of the one or more request runners is a nested request runner grouped with another request runner into the first single edit transaction, and
 wherein the at least one nested request runner is capable of self-detection and thereby operable to avoid starting an edit transaction other than the first single edit transaction; and
provide the abstract component model to contain and support the plurality of model objects.

* * * * *

UNITED STATES PATENT AND TRADEMARK OFFICE
CERTIFICATE OF CORRECTION

| | | |
|---|---|---|
| PATENT NO. | : 8,239,821 B2 | Page 1 of 1 |
| APPLICATION NO. | : 12/113558 | |
| DATED | : August 7, 2012 | |
| INVENTOR(S) | : Cook et al. | |

It is certified that error appears in the above-identified patent and that said Letters Patent is hereby corrected as shown below:

On sheet 1 of 13, Reference Numeral 104, in figure 1, line 1, delete "Roquost" and insert -- Request --, therefor.

On sheet 3 of 13, Reference Numeral 303, in figure 3A, line 2, delete "existst?" and insert -- exists? --, therefor.

On sheet 3 of 13, Reference Numeral 311, in figure 3A, line 3, delete "envent" and insert -- event --, therefor.

On sheet 4 of 13, Reference Numeral 310, in figure 3B, line 2, delete "updato phaso" and insert -- update phase --, therefor.

On sheet 4 of 13, Reference Numeral 316, in figure 3B, line 1, delete "fiing an envent" and insert -- firing an event --, therefor.

In column 6, line 53, delete "un-necessarily" and insert -- unnecessarily --, therefor.

In column 7, line 11, delete "itself" and insert -- itself. --, therefor.

In column 14, line 55, in Claim 14, delete "top- down," and insert -- top-down, --, therefor.

In column 15, line 27-28, in Claim 17, delete "compromising" and insert -- comprising --, therefor.

In column 15, line 30-31, in Claim 18, delete "compromising" and insert -- comprising --, therefor.

Signed and Sealed this
Sixth Day of November, 2012

David J. Kappos
*Director of the United States Patent and Trademark Office*